(12) United States Patent
Liu et al.

(10) Patent No.: US 11,453,597 B2
(45) Date of Patent: Sep. 27, 2022

(54) NANOMETER NIOBIUM CARBIDE/CARBON NANOTUBE REINFORCED DIAMOND COMPOSITE AND A PREPARATION METHOD THEREOF

(71) Applicant: Jilin University, Changchun (CN)

(72) Inventors: Baochang Liu, Changchun (CN); Wenhao Dai, Changchun (CN); Siqi Li, Changchun (CN); Zhe Han, Changchun (CN); Xinzhe Zhao, Changchun (CN); Shujing Wang, Changchun (CN)

(73) Assignee: Jilin University, Changchun (CN)

( * ) Notice: Subject to any disclaimer, the term of this patent is extended or adjusted under 35 U.S.C. 154(b) by 440 days.

(21) Appl. No.: 16/802,613

(22) Filed: Feb. 27, 2020

(65) Prior Publication Data

US 2020/0361777 A1    Nov. 19, 2020

(30) Foreign Application Priority Data

Apr. 4, 2019  (CN) .......................... 201910271517.7

(51) Int. Cl.
| | | |
|---|---|---|
| *C01B 32/26* | (2017.01) | |
| *C01G 33/00* | (2006.01) | |
| *C01B 32/914* | (2017.01) | |
| *C01B 32/166* | (2017.01) | |
| *B82Y 30/00* | (2011.01) | |
| *B82Y 40/00* | (2011.01) | |

(52) U.S. Cl.
CPC ............ *C01B 32/26* (2017.08); *C01B 32/166* (2017.08); *C01B 32/914* (2017.08); *C01G 33/003* (2013.01); *B82Y 30/00* (2013.01); *B82Y 40/00* (2013.01); *C01P 2004/13* (2013.01); *C01P 2004/64* (2013.01)

(58) Field of Classification Search
CPC ..... C01B 32/26; C01B 32/166; C01B 32/914; C01B 32/25; C01B 32/174; C01G 33/003; B82Y 30/00; B82Y 40/00; C01P 2004/13; C01P 2004/64
See application file for complete search history.

(56) References Cited

U.S. PATENT DOCUMENTS

| | | | | |
|---|---|---|---|---|
| 8,080,071 | B1 * | 12/2011 | Vail ...................... | B24D 99/005 |
| | | | | 51/293 |
| 8,702,824 | B1 * | 4/2014 | Sani .................... | E21B 10/5735 |
| | | | | 423/446 |
| 8,911,521 | B1 * | 12/2014 | Miess ................... | E21B 10/567 |
| | | | | 51/293 |
| 8,978,789 | B1 * | 3/2015 | Sani .................... | B24D 99/005 |
| | | | | 175/433 |
| 8,999,025 | B1 * | 4/2015 | Miess .................. | F16C 33/043 |
| | | | | 51/297 |

* cited by examiner

*Primary Examiner* — Daniel C. McCracken
(74) *Attorney, Agent, or Firm* — Harness, Dickey & Pierce, P.L.C.

(57) ABSTRACT

A nanometer niobium carbide/carbon nanotube reinforced diamond composite and a preparation method thereof, belonging to the field of materials science. The nanometer niobium carbide/carbon nanotube reinforced diamond composite is composed of nanometer niobium carbide/carbon nanotube composite powders, matrix powders and diamond grains, wherein the nanometer niobium carbide/carbon nanotube composite powders are the composites of nanometer niobium carbide which are evenly distributed in the surface defects and interior of the carbon nanotube, the nanometer niobium carbide/carbon nanotube reinforced diamond composite is prepared by mixing the nanometer niobium carbide/carbon nanotube composite powders, matrix powders and diamond grains uniformly and sintering with a hot pressing technique.

16 Claims, No Drawings

NANOMETER NIOBIUM CARBIDE/CARBON NANOTUBE REINFORCED DIAMOND COMPOSITE AND A PREPARATION METHOD THEREOF

CROSS-REFERENCE TO RELATED APPLICATION

This application claims priority to Chinese Application No. 201910271517.7, filed Apr. 4, 2019. The disclosure of the above application is incorporated herein by reference.

FIELD

This disclosure relates to diamond composites and a preparation method thereof, particularly relates to a nanometer niobium carbide/carbon nanotube synergistically-reinforced diamond-impregnated composite and a preparation method thereof, which belongs to the field of materials science.

BACKGROUND

The diamond-impregnated composites are composed of matrix powders and diamond particles, which are widely used in the manufacturing of drill bits, saw blade, tool tips and the like, their properties, such as strength and abrasive resistance, mainly depend on the properties of matrix and diamond as well as the combination profile of both. The matrices used for holding diamond in diamond-impregnated bits are mainly metals and metal carbides. As with the wearing of the matrix, diamond particles will expose continually during the process of grinding and micro-cutting on the rock formations. They are widely used in the drilling of hard and very hard formations. When used in drilling of ultra-deep wells, geothermal wells and the like, the complex stress states at the bottom of wells and the increasingly complex conditions of drilling formations has raised higher requirements on the properties of the diamond-impregnated composites, while the matrices of traditional diamond-impregnated composites are difficult to satisfy the demands of drilling operations due to their disadvantages of poor comprehensive mechanical properties and weak wrapping capacities on diamond. Therefore, it is necessary to modify the traditional diamond-impregnated composites and enhance their mechanical properties.

SUMMARY

Against that the matrices of traditional diamond-impregnated composite are difficult to satisfy the demands of drilling operations due to their disadvantages of poor comprehensive mechanical properties and weak wrapping capacities on diamond, the objective of the present invention is to provide a nanometer niobium carbide/carbon nanotube synergistically-reinforced diamond-impregnated composite and a preparation method thereof.

For achievement of the above object, the present invention employs the following technical solution: a method for preparing a nanometer niobium carbide/carbon nanotube reinforced diamond composite, which is characterized in that, including the following steps:

(1) Preparation of nanometer niobium carbide/carbon nanotube composite powders:

Weighing nanometer niobium carbide and carbon nanotube at a mass ratio of (5~10):1, which are added into distilled water respectively and ultrasonic dispersed for 0.5 h~1 h, giving an aqueous dispersion of nanometer niobium carbide and an aqueous dispersion of carbon nanotube; then the aqueous dispersion of nanometer niobium carbide is stirred magnetically, into which is slowly added the aqueous dispersion of carbon nanotube dropwise, and dried in vacuum after 30 min to obtain the composite powders. The composite powders are added into a hard alloy ball-milling tank, into which are additionally added hard alloy grinding balls, wherein the ratio of grinding balls to materials is 40:1, the ball-milling rate is 400 r/min, the time for ball-milling is 3 h~6 h. They are dried in vacuum to obtain nanometer niobium carbide/carbon nanotube composite powders;

Preferably, the particle size of nanometer niobium carbide is 10 nm~30 nm, the length of carbon nanotube is 10 um~30 um, and the outer diameter is 20 nm~70 nm.

The ball-milling medium used during the ball-milling is absolute ethanol.

(2) Preparation of nanometer niobium carbide/carbon nanotube/matrix composite powders:

The nanometer niobium carbide/carbon nanotube composite powders obtained in step (1) and the matrix powders are weighed at weight percentages of nanometer niobium carbide/carbon nanotube composite powders of 0.5 wt %~3 wt % and matrix powders of 97 wt %~99.5 wt %, on which is then conducted the planetary ball milling, wherein the ratio of grinding balls to materials is 6:1, the ball-milling rate is 320 r/min, the time for ball-milling is 3 h~6 h. The powders are dried in vacuum to obtain nanometer niobium carbide/carbon nanotube/matrix composite powders;

Preferably, the matrix powders are composed of WC tungsten carbide powders at a mass fraction of 40%, 35% of 663 bronze powders, 15% of YG6 hard alloy powders, 5% of Ni nickel powders and 5% of Mn manganese powders.

The matrix powders are prepared as below: WC tungsten carbide powder at a mass fraction of 40%, 35% of 663 bronze powders, 15% of YG6 hard alloy powders, 5% of Ni nickel powders and 5% of Mn manganese powders are added into a hard alloy ball-milling tank, at the same time adding hard alloy grinding balls, wherein the ratio of grinding balls to materials is 6:1, the ball-milling rate is 320 r/min, the time for ball-milling is 1 h~2 h. The powders are then dried in vacuum to obtain the matrix powders.

The particle size of WC tungsten carbide powder is −200 meshes, the particle size of 663 bronze powder is −200 meshes, the particle size of YG6 hard alloy powder is −300 meshes, the particle size of Ni nickel powder is −200 meshes, and the particle size of Mn manganese powder is −200 meshes.

(3) The nanometer niobium carbide/carbon nanotube/matrix composite powders obtained in step (2) and diamond grains are weighed at volume percentages of nanometer niobium carbide/carbon nanotube/matrix composite powders of 70 vol %~80 vol % and diamond grains of 20 vol %~30 vol %, then placed into a three-dimensional mixing machine to mix for 1 h~3 h, giving mixed powders;

wherein, the diamond grains are artificial diamond monocrystals which are 40 meshes~100 meshes in size.

(4) The mixed powders obtained in step (3) are charged into graphite moulds, and sintered in a hot pressing sintering furnace, generating nanometer niobium carbide/carbon nanotube reinforced diamond composites.

The sintering process is as below: within 300 s, the temperature of mixed powders is increased to 980° C., the pressure is increased from 0 MPa to 18 MPa, keeping the sintering temperature at 980° C. and the pressure at 18 MPa, with a holding time of 300 s; and then within 300 s, the temperature is reduced to 450° C., the pressure is reduced to 6 Mpa; finally withdrawing the pressure and cooling naturally to room temperature.

A nanometer niobium carbide/carbon nanotube reinforced diamond composite, which is characterized in that: it is prepared with the above method.

Through the above proposal, the present invention may produce the following beneficial effects: the present invention proposes a nanometer niobium carbide/carbon nanotube synergistically-reinforced diamond-impregnated composite and a preparation method thereof, the nanometer niobium carbides are granular nanometer materials, which have better affinities compared with the traditional tungsten carbide-bronze based diamond-impregnated composite, and may enhance the hardness and strength of the composite under the mechanism of dispersion strengthening, while the carbon nanotubes are fibrous nanometer materials, which may reinforce the strength and toughness under the fiber strengthening mechanisms of crack-bridging, crack-deflection, and the like. The co-use of these two kinds of nanometer materials would not only allow these two kinds of nanometer materials to complement each other's advantages, also help to reduce the agglomeration of these two kinds of nanometer materials in the diamond-impregnated composite. The nanometer niobium carbide/carbon nanotube reinforced diamond composite prepared in the present invention possesses high matrix hardness, high bending strength, high abrasive resistance and high impact strength at the same time, the use of which in manufacturing the diamond-impregnated bit would be beneficial for enhancing the efficiency and working life of the bit in deep well drilling and strong abrasive formation drilling.

DETAILED DESCRIPTION

For illustrating the present invention more clearly, it will be further illustrated accompanying with preferred embodiments below. It will be understood to persons skilled in the art that the following detailed descriptions are illustrative but not restrictive, which would not be construed to confine the scope of the invention.

The nanometer niobium carbide/carbon nanotube reinforced diamond composite provided in the present invention is composed of nanometer niobium carbide/carbon nanotube composite powders, matrix powders and diamond grains, the nanometer niobium carbide/carbon nanotube composite powders are the composites of nanometer niobium carbide which are evenly distributed in the surface defects and interior of the carbon nanotube, the nanometer niobium carbide/carbon nanotube reinforced diamond composite is prepared by mixing the nanometer niobium carbide/carbon nanotube composite powders, matrix powders and diamond grains uniformly and sintering with a hot pressing technique.

The particle size of nanometer niobium carbide used in the present invention is 10 nm~30 nm, the length of carbon nanotube is 10 um~30 um, and the outer diameter is 20 nm~70 nm.

Different matrix powders could be selected according to different formation conditions, in the present invention, with 63# formula, which is researched and applied widely at present, as the example, it is composed of WC tungsten carbide powders at a mass fraction of 40%, 35% of 663 bronze powders, 15% of YG6 hard alloy powders, 5% of Ni nickel powders and 5% of Mn manganese powders. The particle size of WC tungsten carbide powder is −200 meshes, the particle size of 663 bronze powder is −200 meshes, the particle size of YG6 hard alloy powder is −300 meshes, the particle size of Ni nickel powder is −200 meshes, and the particle size of Mn manganese powder is −200 meshes.

The diamond grains used in the present invention are artificial diamond monocrystals which are 40 meshes~100 meshes in size. According to different formation conditions, artificial diamond monocrystals with reasonable particle sizes are selected to prepare the diamond composite.

Embodiment 1

In this Embodiment, the method for preparing the nanometer niobium carbide/carbon nanotube reinforced diamond composite includes the following steps:

(1) weighing 2.5 g nanometer niobium carbide and 0.5 g carbon nanotube, which are added into 30 mL distilled water respectively and ultrasonic dispersed for 0.5 h. Then the aqueous dispersion of nanometer niobium carbide is stirred magnetically, into which is slowly added the aqueous dispersion of carbon nanotube dropwise, and dried in vacuum after 30 min to obtain the composite powders. The composite powders are added into a hard alloy ball-milling tank, into which are additionally added hard alloy grinding balls, wherein the ratio of grinding balls to materials is 40:1, the ball-milling medium is absolute ethanol, the ball-milling rate is 400 r/min, the time for ball-milling is 3 h, and dried in vacuum to obtain the nanometer niobium carbide/carbon nanotube composite powders which can be used as the diamond-impregnated composite reinforcements;

(2) weighing 24 g WC tungsten carbide powders, 21 g 663 bronze powders, 9 g YG6 hard alloy powders, 3 g nickel Ni powders and 3 g manganese Mn powders, which are added into a hard alloy ball-milling tank, into which is simultaneously added absolute ethanol as the ball-milling medium, as well as hard alloy grinding balls, wherein the ratio of grinding balls to materials is 6:1, the ball-milling rate is 320 r/min, the time for ball-milling is 1 h, and then dried in vacuum to obtain the matrix powders;

(3) weighing 0.3 g nanometer niobium carbide/carbon nanotube composite powders and 59.7 g matrix powders, on which is conducted the planetary ball milling in the medium of absolute ethanol, wherein the ratio of grinding balls to materials is 6:1, the ball-milling rate is 320 r/min, the time for ball-milling is 3 h. They are dried in vacuum to obtain the nanometer niobium carbide/carbon nanotube/matrix composite powders;

(4) weighing 43.32 g nanometer niobium carbide/carbon nanotube/matrix composite powders and 3.36 g diamond grains, which are mixed in a three-dimensional mixing machine for 2 h, giving mixed powders. The mixed powders are charged into graphite moulds, and sintered in a hot pressing sintering furnace. The sintering process is as below: within 300 s, the temperature of mixed powders is increased to 980° C., the pressure is increased from 0 MPa to 18 MPa, keeping the sintering temperature at 980° C. and the pressure at 18 MPa, with a holding time of 300 s; and then within 300 s, the temperature is reduced to 450° C., the pressure is reduced to 6 Mpa, finally withdrawing the pressure and cooling naturally to room temperature, to obtain the nanometer niobium carbide/carbon nanotube reinforced diamond composite.

Embodiment 2

In this Embodiment, the method for preparing the nanometer niobium carbide/carbon nanotube reinforced diamond composite includes the following steps:

(1) weighing 2.4 g nanometer niobium carbide and 0.3 g carbon nanotube, which are added into 30 mL distilled water respectively and ultrasonic dispersed for 1 h. Then the aqueous dispersion of nanometer niobium carbide is stirred magnetically, into which is slowly added the aqueous dispersion of carbon nanotube dropwise, and dried in vacuum after 30 min to obtain the composite powders. The composite powders are added into a hard alloy ball-milling tank, into which are additionally added hard alloy grinding balls, wherein the ratio of grinding balls to materials is 40:1, the ball-milling medium is absolute ethanol, the ball-milling rate is 400 r/min, the time for ball-milling is 4 h. They are dried in vacuum to obtain the nanometer niobium carbide/carbon nanotube composite powders which can be used as the diamond-impregnated composite reinforcements;

(2) weighing 24 g WC tungsten carbide powders, 21 g 663 bronze powders, 9 g YG6 hard alloy powders, 3 g nickel Ni powders and 3 g manganese Mn powders, which are added into a hard alloy ball-milling tank, into which is simultaneously added absolute ethanol as the ball-milling medium, as well as hard alloy grinding balls, wherein the ratio of grinding balls to materials is 6:1, the ball-milling rate is 320 r/min, the time for ball-milling is 1.5 h, and then dried in vacuum to obtain the matrix powders;

(3) weighing 1.2 g nanometer niobium carbide/carbon nanotube composite powders and 58.8 g matrix powders, on which is conducted the planetary ball milling in the medium of absolute ethanol, wherein the ratio of grinding balls to materials is 6:1, the ball-milling rate is 320 r/min, the time for ball-milling is 5 h, and dried in vacuum to obtain the nanometer niobium carbide/carbon nanotube/matrix composite powders;

(4) weighing 42.81 g nanometer niobium carbide/carbon nanotube/matrix composite powders and 3.36 g diamond grains, which are mixed in a three-dimensional mixing machine for 2 h, giving mixed powders. The mixed powders are charged into graphite moulds, and sintered in a hot pressing sintering furnace. The sintering process is as below: within 300 s, the temperature of mixed powders is increased to 980° C., the pressure is increased from 0 MPa to 18 MPa, keeping the sintering temperature at 980° C. and the pressure at 18 MPa, with a holding time of 300 s; and then within 300 s, the temperature is reduced to 450° C., the pressure is reduced to 6 Mpa, finally withdrawing the pressure and cooling naturally to room temperature, to obtain the nanometer niobium carbide/carbon nanotube reinforced diamond composite.

Embodiment 3

In this Embodiment, the method for preparing the nanometer niobium carbide/carbon nanotube reinforced diamond composite includes the following steps:

(1) weighing 3 g nanometer niobium carbide and 0.3 g carbon nanotube, which are added into 30 mL distilled water respectively and ultrasonic dispersed for 1 h. Then the aqueous dispersion of nanometer niobium carbide is stirred magnetically, into which is slowly added the aqueous dispersion of carbon nanotube dropwise, and dried in vacuum after 30 min to obtain the composite powders. The composite powders are added into a hard alloy ball-milling tank, into which are additionally added hard alloy grinding balls, wherein the ratio of grinding balls to materials is 40:1, the ball-milling medium is absolute ethanol, the ball-milling rate is 400 r/min, the time for ball-milling is 6 h. They are dried in vacuum to obtain the nanometer niobium carbide/carbon nanotube composite powders which can be used as the diamond-impregnated composite reinforcements;

(2) weighing 24 g WC tungsten carbide powders, 21 g 663 bronze powders, 9 g YG6 hard alloy powders, 3 g nickel Ni powders and 3 g manganese Mn powders, which are added into a hard alloy ball-milling tank, into which is simultaneously added absolute ethanol as the ball-milling medium, as well as hard alloy grinding balls, wherein the ratio of grinding balls to materials is 6:1, the ball-milling rate is 320 r/min, the time for ball-milling is 2 h, and then dried in vacuum to obtain the matrix powders;

(3) weighing 1.8 g nanometer niobium carbide/carbon nanotube composite powders and 58.2 g matrix powders, on which is conducted the planetary ball milling in the medium of absolute ethanol, wherein the ratio of grinding balls to materials is 6:1, the ball-milling rate is 320 r/min, the time for ball-milling is 6 h, and dried in vacuum to obtain the nanometer niobium carbide/carbon nanotube/matrix composite powders;

(4) weighing 42.53 g nanometer niobium carbide/carbon nanotube/matrix composite powders and 3.36 g diamond grains, which are mixed in a three-dimensional mixing machine for 2 h, giving mixed powders, the mixed powders are charged into graphite moulds, and sintered in a hot pressing sintering furnace, the sintering process is as below: within 300 s, the temperature of mixed powders is increased to 980° C., the pressure is increased from 0 MPa to 18 MPa; keeping the sintering temperature at 980° C. and the pressure at 18 MPa, with a holding time of 300 s; and then within 300 s, the temperature is reduced to 450° C., the pressure is reduced to 6 Mpa, finally withdrawing the pressure and cooling naturally to room temperature, to obtain the nanometer niobium carbide/carbon nanotube reinforced diamond composite.

The foregoing descriptions are only preferred implementation manners of the present disclosure. It should be noted that for a person of ordinary skill in the art, several improvements and modifications may further be made without departing from the principle of the present disclosure. These improvements and modifications should also be deemed as falling within the protection scope of the present disclosure.

What is claimed is:

1. A method for preparing a nanometer niobium carbide/carbon nanotube reinforced diamond composite, comprising the following step:
(1) preparing nanometer niobium carbide/carbon nanotube composite powders; by,
weighing nanometer niobium carbide and carbon nanotube at a mass ratio of (5~10):1, which are added into distilled water respectively and ultrasonic dispersed for 0.5 h~1 h, giving an aqueous dispersion of nanometer niobium carbide and an aqueous dispersion of carbon nanotube; thereafter, magnetically stirring the aqueous dispersion of nanometer niobium carbide and slowly adding the aqueous dispersion of carbon nanotube dropwise, and drying in vacuum after 30 min to obtain the composite powders, adding the composite powders into a hard alloy ball-milling tank, into which are additionally added hard alloy grinding balls, wherein the ratio of grinding balls to materials is 40:1, the ball-milling rate is 400 r/min, the time for ball-milling is 3 h~6 h, and dried in vacuum to obtain nanometer niobium carbide/carbon nanotube composite powders;
(2) preparing of nanometer niobium carbide/carbon nanotube/matrix composite powders; by,
weighing the nanometer niobium carbide/carbon nanotube composite powders obtained in step (1) and the matrix powders at weight percentages of nanometer niobium carbide/carbon nanotube composite powders of 0.5 wt %~3 wt % and matrix powders of 97 wt %~99.5 wt %, on which is then conducted the planetary ball milling, wherein the ratio of grinding balls to materials is 6:1, the ball-milling rate is 320 r/min, the time for ball-milling is 3 h~6 h, and dried in vacuum to obtain nanometer niobium carbide/carbon nanotube/ matrix composite powders;

(3) weighing the nanometer niobium carbide/carbon nanotube/matrix composite powders obtained in step (2) and diamond grains at volume percentages of nanometer niobium carbide/carbon nanotube/matrix composite powders of 70 vol %~80 vol % and diamond grains of 20 vol %~30 vol %, and then placed into a three-dimensional mixing machine to mix for 1 h~3 h, giving mixed powders;

(4) charging into graphite moulds the mixed powders obtained in step (3), and sintering in a hot pressing sintering furnace, giving nanometer niobium carbide/ carbon nanotube reinforced diamond composites.

2. The method for preparing a nanometer niobium carbide/carbon nanotube reinforced diamond composite of claim 1, wherein the particle size of nanometer niobium carbide is 10 nm~30 nm, the length of carbon nanotube is 10 um~30 um, and the outer diameter is 20 nm~70 nm.

3. The method for preparing a nanometer niobium carbide/carbon nanotube reinforced diamond composite of claim 1, wherein the matrix powder in step (2) is composed of WC tungsten carbide powders at a mass fraction of 40%, 35% of 663 bronze powders, 15% of YG6 hard alloy powders, 5% of Ni nickel powders and 5% of Mn manganese powders.

4. The method for preparing a nanometer niobium carbide/carbon nanotube reinforced diamond composite of claim 3, wherein the matrix powders are prepared as below: WC tungsten carbide powder at a mass fraction of 40%, 35% of 663 bronze powders, 15% of YG6 hard alloy powders, 5% of Ni nickel powders and 5% of Mn manganese powders are added into a hard alloy ball-milling tank, at the same time adding hard alloy grinding balls, wherein the ratio of grinding balls to materials is 6:1, the ball-milling rate is 320 r/min, the time for ball-milling is 1 h~2 h, and then dried in vacuum to obtain the matrix powder.

5. The method for preparing a nanometer niobium carbide/carbon nanotube reinforced diamond composite of claim 3, wherein the particle size of WC tungsten carbide powder is −200 meshes, the particle size of 663 bronze powder is −200 meshes, the particle size of YG6 hard alloy powder is −300 meshes, the particle size of Ni nickel powder is −200 meshes, and the particle size of Mn manganese powder is −200 meshes.

6. The method for preparing a nanometer niobium carbide/carbon nanotube reinforced diamond composite of claim 1, wherein the diamond grains are artificial diamond monocrystals which are 40 meshes~100 meshes in size.

7. The method for preparing a nanometer niobium carbide/carbon nanotube reinforced diamond composite of claim 1, wherein the ball-milling medium used during the ball-milling of step (1) is absolute ethanol.

8. The method for preparing a nanometer niobium carbide/carbon nanotube reinforced diamond composite of claim 1, wherein the sintering process in step (4) is as below: within 300 s, the temperature of mixed powders is increased to 980° C., the pressure is increased from 0 MPa to 18 MPa, keeping the sintering temperature at 980° C. and the pressure at 18 MPa, with a holding time of 300 s; and then within 300 s, the temperature is reduced to 450° C., the pressure is reduced to 6 Mpa; finally withdrawing the pressure and cooling naturally to room temperature.

9. A nanometer niobium carbide/carbon nanotube reinforced diamond composite prepared with the method of method of claim 1.

10. A nanometer niobium carbide/carbon nanotube reinforced diamond composite prepared with the method of claim 2.

11. A nanometer niobium carbide/carbon nanotube reinforced diamond composite prepared with the method of claim 3.

12. A nanometer niobium carbide/carbon nanotube reinforced diamond composite prepared with the method of claim 4.

13. A nanometer niobium carbide/carbon nanotube reinforced diamond composite prepared with the method of claim 5.

14. A nanometer niobium carbide/carbon nanotube reinforced diamond composite prepared with the method of claim 6.

15. A nanometer niobium carbide/carbon nanotube reinforced diamond composite prepared with the method of claim 7.

16. A nanometer niobium carbide/carbon nanotube reinforced diamond composite prepared with the method of claim 8.

* * * * *